United States Patent [19]

Krenzer et al.

[11] 3,860,644

[45] Jan. 14, 1975

[54] NEW COMPOSITIONS OF MATTER

[75] Inventors: John Krenzer, Oak Park; Sidney B. Richter, Chicago, both of Ill.

[73] Assignee: Velsicol Chemical Corporation, Chicago, Ill.

[22] Filed: July 30, 1970

[21] Appl. No.: 59,706

[52] U.S. Cl.............. 260/545 R, 71/67, 71/116, 71/117, 260/456 R
[51] Int. Cl............................................ C07c 127/20
[58] Field of Search............................ 260/545, 453

[56] References Cited
UNITED STATES PATENTS
3,371,106   2/1968   Berliner et al..................... 260/453

FOREIGN PATENTS OR APPLICATIONS
1,537,803   7/1968   France............................... 260/545
182,729     6/1966   U.S.S.R............................. 260/545

Primary Examiner—Robert Gerstl
Attorney, Agent, or Firm—Robert J. Schwarz; Dietmar H. Olesch

[57] ABSTRACT

A compound of the formula

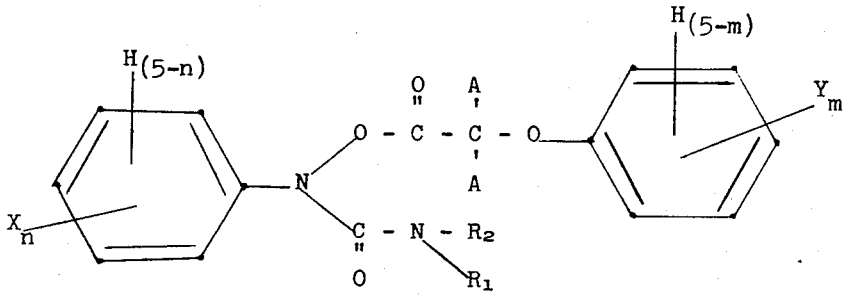

wherein each X is independently selected from the group consisting of halogen, alkyl, alkenyl, haloalkyl, nitro, alkoxy, alkylthio, alkylsulfinyl, alkysulfonyl and dialkylamine; m and n are integers from 0 to 4; Y is alkyl or halogen; $R_1$ and $R_2$ are independently selected from the group consisting of hydrogen, alkyl, alkenyl and haloalkyl and each A is alkyl or hydrogen. These compounds are useful as herbicides and algaecides.

2 Claims, No Drawings

NEW COMPOSITIONS OF MATTER

This invention relates to new compositions of matter. In particular this invention relates to new compounds of the formula

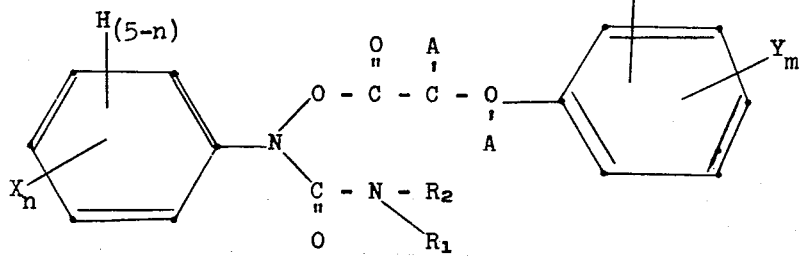

wherein each X is independently selected from the group consisting of halogen, alkyl, alkenyl, haloalkyl, nitro, alkoxy, alkylthio, alkylsulfinyl, alkylsulfonyl and dialkylamino; m and n are integers from 0 to 4; Y is alkyl or halogen; $R_1$ and $R_2$ are each independently selected from the group consisting of hydrogen, alkyl, alkenyl and haloalkyl and each A is alkyl or hydrogen.

In a preferred embodiment of this invention each X is independently selected from the group consisting of chlorine, bromine, lower alkyl, lower alkenyl, lower chloroalkyl, lower bromoalkyl, nitro, lower alkoxy, lower alkylthio, lower alkylsulfinyl, lower alkylsulfonyl, and di(lower alkyl) amino; Y is chlorine, bromine or methyl; m and n are integers from 0 to 3; $R_1$ and $R_2$ are each independently selected from the group consisting of hydrogen, lower alkyl, lower alkenyl and lower haloalkyl; and each A is lower alkyl or hydrogen.

The new compounds of the present invention can be prepared by reacting a hydroxy urea of the formula

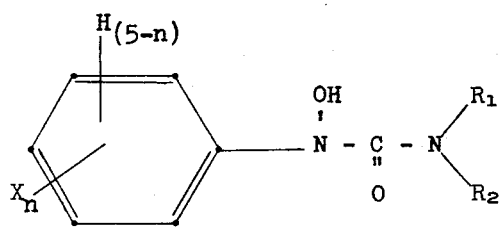

wherein $R_1$ and $R_2$, X and $n$ are as heretofore described, with an acid chloride of the formula

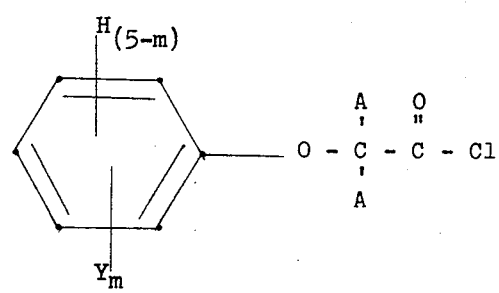

wherein Y, $m$, and A are heretofore described. This reaction can be readily carried out by adding the described acid chloride to a solution or slurry of the described hydroxyurea in the presence of a base, such as tertiary amino or alkali metal hydroxide, at a temperature of from about 0°C. to about 50°C. The desired product can then be recovered by methods well known to the art, such as distillation, if the product remains in solution, filtration, if the product forms as a precipitate, and the like. The product can then be used as such or can be further purified by washing, recrystallizing and the like.

Exemplary suitable hydroxy ureas for the purpose of this invention are 1-(3,4-dibromophenyl)-1-hydroxy-3-methylurea, 1-(3,4-dichlorophenyl)-1-hydroxy-3-ethylurea, 1-(2-methyl-3-chlorophenyl)-1-hydroxy-3-methylurea, 1-(3-nitro-4-methylphenyl)-1-hydroxy-3-isopropylurea, 1-(3,4-dichlorophenyl)-1-hydroxy-3,3-dimethylurea, 1-(2-methoxy-4-chlorophenyl)-1-hydroxy-3-methylurea, 1-(4-trichloromethylphenyl)-1-hydroxy-3-methylurea, 1-(3-dimethylamino-4-chlorophenyl)-1-hydroxy-3-methylurea, 1-(4-allylphenyl)-1-hydroxy-3,3-diethylurea, 1-(3,4-dichlorophenyl)-1-hydroxyurea, 1-(3-methylthiophenyl)-1-hydroxy-3-methylurea, 1-(4-methylsulfonylphenyl)-1-hydroxy-3-ethylurea, 1-(4-ethylsulfinylphenyl)-1-hydroxy-3-methylurea and the like.

Exemplary suitable acid chlorides for the production of the new compounds of this invention are α-(2,4-dichlorophenoxy)acetyl chloride, α-(2-methylphenoxy)propionyl chloride, α-(2-methylsulfinyl-4-nitrophenoxy)valeryl chloride, α-(3-ethylthio-4-bromophenoxy)-α-t-butylbutyryl chloride, α-(2-methoxyphenoxy)acetyl chloride, α-(3-ethylsulfonyl-2-bromomethylphenoxy)butyryl chloride, α-(3-allylphenoxy)acetyl chloride, α-(4-chloroethylphenoxy)acetyl chloride, α-(2-nitro-4-bromophenoxy)acetyl chloride, α-(2-bromopropyl)-4-ethylsulfonyl phenoxy)-α-methylbutyryl chloride, α-(2,4-dimethylaminophenoxy)-α-methylbutyryl chloride, α-(3-propylaminophenoxy)caprylyl chloride and the like.

The procedure by which the compounds of the present invention can be prepared readily is illustrated in the following examples.

EXAMPLE 1

Preparation of 1-(3,4-dichlorophenyl)-1[(2,4-dichlorophenoxy)acetoxy]-3-methylurea A solution of 1-(3,4-dichlorophenyl)-1-hydroxy-3-methylurea (5.0 grams; 0.021 mol) and triethylamine (3.2 ml; 0.022 mol) in ether (400 ml) was charged into a reaction flask equipped with a mechanical stirrer. α-(2,4-Dichlorophenoxy)acetyl chloride (5.1 grams; 0.021 mol) was added over a 15 minute period. Stirring was continued for an additional hour. The precipitated trimethylamine hydrochloride was removed by filtration and the ether solution was evaporated to about 150 ml, causing crystallization of the product. The precipitate was recovered by filtration and vacuum dried. It was found to have a melting point of 121°–122°C and the following elemental analysis. Analysis for $C_{16}H_{12}Cl_4N_2O_4$-Theoretical, percent: C, 43.84; H, 2.76; N, 6.40; Found, percent: C, 44.49; H, 3.67; N, 6.37.

EXAMPLE 2

Preparation of 1-(3-chlorophenyl)-1[(2,4-dichlorophenoxy)acetoxy]-3-methylurea

A solution of 1-(3-chlorophenyl)-1-hydroxy-3-methylurea (4.3 grams; 0.021 mol) and triethylamine (3.2 ml; 0.022 mol) in ether (400 ml) was charged into a reaction flask equipped with a mechanical stirrer. α-(2,4-Dichlorophenoxy)acetyl chloride (5.1 grams; 0.021 mol) was added over a 15 minute period. Stirring was continued for an additional hour. The precipitated trimethylamine hydrochloride was removed by filtration and the solution was evaporated to about 150 ml. causing crystallization of the product. The precipitate was recovered by filtration and vacuum dried. It was found to have a melting point of 99°–101°C and the following elemental analysis. Analysis for $C_{16}H_{13}Cl_3N_2O_4$-Theoretical, percent: C, 47.71; H, 3.25; N, 6.95; Found, percent: C, 46.86; H, 3.95; N, 6.37.

EXAMPLE 3

Preparation of 1-phenyl-1[(2,4-dichlorophenoxy)acetoxy]-3-methylurea

A solution of 1-phenyl-1-hydroxy-3-methylurea (5.0 grams; 0.030 mol) and triethylamine (4.4 ml; 0.30 mol) in ether (100 ml) was charged into a reaction flask equipped with a mechanical stirrer. α-(2,4-Dichlorophenoxy)acetylchloride (7.3 grams; 0.030 mol) was added over a 15 minute period. Stirring was continued for an additional hour. The precipitated trimethylamine hydrochloride was removed by filtration and the solution was evaporated to about 150 ml. causing crystallization of the product. This product was then recrystallized from methanol, dried and found to have a melting point of 98°–99°C. Its elemental analysis is as follows: Analysis for $C_{16}H_{14}Cl_2N_2O_4$-Theoretical, percent: C, 51.88; H, 4.08; N, 7.57; Found, percent: C, 52.06; H, 3.85; N, 7.43.

Other compounds within the scope of this invention can be prepared by the procedures described in the foregoing examples. Present in the following examples are the reactants required to prepare the specified compounds according to the procedures heretofore described.

EXAMPLE 4

Preparation of 1-(3,4-dibromophenyl)-1-[α-(2-chlorophenoxy)-α-ethylbutyroxy]-3-methylurea 1-(3,4-Dibromophenyl)-1-hydroxy-3-methylurea +α-(2-chlorophenoxy)-α-ethylbutyryl chloride.

EXAMPLE 5

Preparation of 1-(2-nitro-3-chloroethylphenyl)-1-[α-(2-methyl-4-bromophenoxy)propionoxy]-3-pentylurea 1-(2-Nitro-3-chloroethylphenyl)-1-hydroxy-3-pentylurea +α-(2-methyl-4-bromophenoxy)propionyl chloride.

EXAMPLE 6

Preparation of 1-(2-allylphenyl)-1-[(4-butylphenoxy)acetoxy]-3-allylurea 1-(2-Allylphenyl-1-hydroxy-3-allylurea +α-(4-butylphenoxy)acetyl chloride.

EXAMPLE 7

Preparation of 1-(4-diethylaminophenyl)-1-[α-(2-pentyl-3-chlorophenoxy)-α-methylbutyroxy]-3-ethylurea 1-(4-Diethylaminophenoxy)-1-hydroxy-3-ethylurea +α-(2-pentyl-3-chlorophenoxy)-α-methylbutyryl chloride.

EXAMPLE 8

Preparation of 1-(3-propylsulfinyl-4-nitrophenyl)-1-[(2-bromo-3-iodophenoxy)acetoxy]-3-bromomethylurea 1-(3-Propylsulfinyl-4-nitrophenyl)-1-hydroxy-3-bromomethylurea +α-(2-bromo-3-iodophenoxy)acetyl chloride.

EXAMPLE 9

Preparation of 1-(2-methylsulfonyl-4-bromophenyl)-1-[(2-hexyl-3-chlorophenoxy)acetoxy]-3-methyl-3-chloropropylurea 1-(2-Methylsulfonyl-4-bromophenyl)-1-hydroxy-3-methyl-3-chloropropylurea +α-(2-hexyl-3-chlorophenoxy)acetyl chloride.

EXAMPLE 10

Preparation of 1-(2-chloropentyl-3-propylthiophenyl)-1-[α-(3-pentylphenoxy)butyroxy]-3-propyl-3-bromomethylurea 1-(2-Chloropentyl-3-propylthiophenyl)-1-hydroxy-3-propyl-3-bromomethylurea +α-(3-pentylphenoxy)-butyryl chloride.

EXAMPLE 11

Preparation of 1-(3-pentylsulfonyl-4-bromophenyl)-1-[α-(2-iodo-3-decylphenoxy)-α-methylbutyroxy]-3-allylurea 1-(3-Pentylsulfonyl-4-bromophenyl)-1-hydroxy-3-allylurea +α-(2-iodo-3-decylphenoxy)-α-methylbutyryl chloride.

EXAMPLE 12

Preparation of 1-(2-pentyloxy-3-dipentylaminophenyl)-1-[(4-bromophenoxy)acetoxy]-3-propyl-3-chloroethylurea 1-(2-Pentyloxy-3-dipentylaminophenyl)-1-hydroxy-3-propyl-3-chloroethylurea +α-(4-bromophenoxy)acetyl chloride.

For practical use as herbicides, the compounds of this invention are generally incorporated into herbicidal compositions which comprise an inert carrier and herbicidally toxic amount of such a compound. Such herbicidal compositions, which can also be called formulations, enable the active compound to be applied conveniently. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid pesticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in-oil) can be prepared for direct application to pest infestations.

A typical herbicidal composition according to this invention is illustrated by the following example, in which the quantities are in parts by weight.

Example 18

Preparation of a Dust

| | |
|---|---|
| Product of Example 1 | 10 |
| Powdered talc | 90 |

The above ingredients are mixed in a mechanical grinder-blender and are ground until a homogeneous, freeflowing dust of the desired particle size is obtained. This dust is suitable for direct application to the site of the weed infestation.

When used as herbicides, the compounds of this invention can be applied in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stablizers; spreaders; deactivators; adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5 to about 95% of the active ingredients in the herbicidal compositions. Use of combinations of these other herbicidal and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include clorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA diuron, linuron, monolinuron, neburon, buturon, trimeturon and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides such as alpha-chloro-N, N-dimethylacetamide, CDEA, CDAA, alpha-chloro-N-isopropylacetamide, 2-chloro-N-isopropylacetanilide 4-(chloroacetyl)morpholine, 1-(chloroacetyl)piperidine, and the like; chlorinated aliphatic acid herbicides such as TCA, dalapon, 2,3-dichloropropionic acid, 2,2,3-TPA and the like, chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil; DPA, diphenamid, dipropalin, trifluralin, solan, dicryl, merphos, DMPA, o-S-dimethyl tetrachlorothioterephthalate, methyl 2,3,5,6-tetrachloro-N-methoxy-N-methyl-terephthalamate, 2-[(4-chloro-o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, planavin, sodium tetraborate, calcium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettel, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, roundleaved mallow, bull thistle, hounds-tongue, moth mullein and purple star thistle; or perennials such as white bulrush, cattail and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal activity of the compounds of this invention was demonstrated by experiments carried out for the post emergence control of barnyard grass,, bindweed, coffee weed, crabgrass, curly dock, downy brome, foxtail, johnson grass, matricaria, mustard, pigweed, velvet leaf, and wild oats. In these experiments the compounds to be tested were formulated as aqueous emulsions and sprayed at the rate of ½, 1, 2, 4 and 8 lb. per acre on the foliage of the test specimens. After spraying the plants were placed in a greenhouse and watered daily or more frequently. Water was not applied to the foliage of the treated plants. The severity of the injury was determined 10 to 15 days after treatment and was rated on the scale of from 0 to 10 as follows: 0 = no injury, 1,2 = slight injury, 3,4 = moderate injury, 5,6 = moderately severe injury, 7,8,9 = severe injury and 10 = death. The effectiveness of these compounds as post-emergence herbicides is demonstrated by the following data:

TABLE I

| | Injury Rating | | | | | | | | | |
|---|---|---|---|---|---|---|---|---|---|---|
| | Product of Example 1 | | | | | Product of Example 2 | | | | |
| | lbs. per acre | | | | | lbs. per acre | | | | |
| Weed Species | ½ | 1 | 2 | 4 | 8 | ½ | 1 | 2 | 4 | 8 |
| Barnyard Grass | 0 | 1 | 6 | 9 | 9 | 1 | 2 | 6 | 8 | 9 |
| Bindweed | 5 | 10 | 7 | 8 | 10 | 8 | 8 | 8 | 9 | 9 |
| Coffee Weed | 4 | 7 | 8 | 9 | 10 | 5 | 6 | 9 | 9 | 9 |
| Crabgrass | 1 | 2 | 2 | 7 | 9 | 0 | 0 | 3 | 7 | 9 |
| Curly Dock | 1 | 8 | 8 | 9 | 10 | 0 | 1 | 8 | 9 | 9 |
| Downy Brome | 0 | 0 | 1 | 3 | 7 | 0 | 0 | 2 | 3 | 5 |
| Foxtail | 2 | 6 | 7 | 9 | 10 | 5 | 7 | 8 | 10 | 10 |
| Johnson Grass | 0 | 3 | 5 | 6 | 7 | 3 | 5 | 4 | 7 | 8 |
| Matricaria | 7 | 9 | 10 | 10 | 10 | 4 | 5 | 9 | 10 | 10 |
| Mustard | 10 | 10 | 10 | 10 | 10 | 9 | 10 | 10 | 10 | 10 |
| Pigweed | 5 | 8 | 10 | 10 | 10 | 5 | 7 | 9 | 10 | 10 |
| Velvet Leaf | 9 | 10 | 10 | 10 | 10 | 9 | 9 | 10 | 10 | 10 |
| Wild Oats | 0 | 2 | 3 | 7 | 6 | 0 | 2 | 2 | 3 | 4 |

In addition, the compounds of the present invention are useful in the control of algae. The algaecidal activity of these compounds was determined by preparing a formula of 25 mg. of test compound in 80 ml of acetone containing 2.482 mg. of emulsifier. This formulation was added to 225 ml. of a solution prepared by adding 16 ml. of a 12-6-6 liquid fertilizer to 1 gallon of tap water. This test solution was placed in a paper cup and stirred. One ounce of soil containing chlamydomonas spp. was placed into the solution. Readings were made 7 days later for the percent control of the algae as follows:

TABLE 2

| | Percent Control | |
|---|---|---|
| Conc. PPM | Product of Example 1 | Product of Example 2 |
| 1.39 | 40 | 5 |
| 2.78 | 50 | 50 |
| 5.56 | 65 | 85 |
| 11.125 | 95 | 97 |
| 22.25 | 99 | 100 |
| 50 | 100 | 100 |
| 100 | 100 | 100 |

We claim:
1. 1-(3,4-dibromophenyl)-1-[(α-2-chlorophenoxy)-α-ethylbutyroxy]-3-methylurea.
2. 1-(2-nitro-3-chloroethylphenyl)-1-[(α-2-methyl-4-bromophenoxy)propionoxy]-3-pentylurea.

* * * * *

PO-1050
(5/69)

UNITED STATES PATENT OFFICE
CERTIFICATE OF CORRECTION

Patent No. 3,860,644               Dated  January 14, 1975

Inventor(s) John Krenzer and Sidney B. Richter

It is certified that error appears in the above-identified patent and that said Letters Patent are hereby corrected as shown below:

In column 1, lines 9 to 13, the portion of the formula appearing as

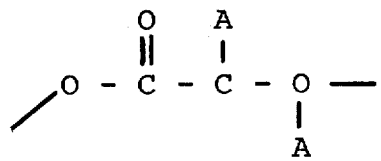

should read

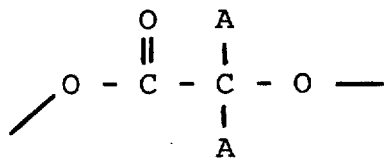

In column 1, line 68, for "amino" read -- amine --.

In column 6, line 7, for "herbicidal" read -- herbicides --.

Signed and sealed this 13th day of May 1975.

(SEAL)
Attest:

RUTH C. MASON
Attesting Officer

C. MARSHALL DANN
Commissioner of Patents
and Trademarks